June 25, 1968     M. ARMETTI     3,389,535
PROTECTIVE PACKAGING OF PLASTIC MATERIAL FOR VIALS AND THE
LIKE, AS WELL AS PROCESS AND EQUIPMENT
FOR OBTAINING IT
Filed April 6, 1965
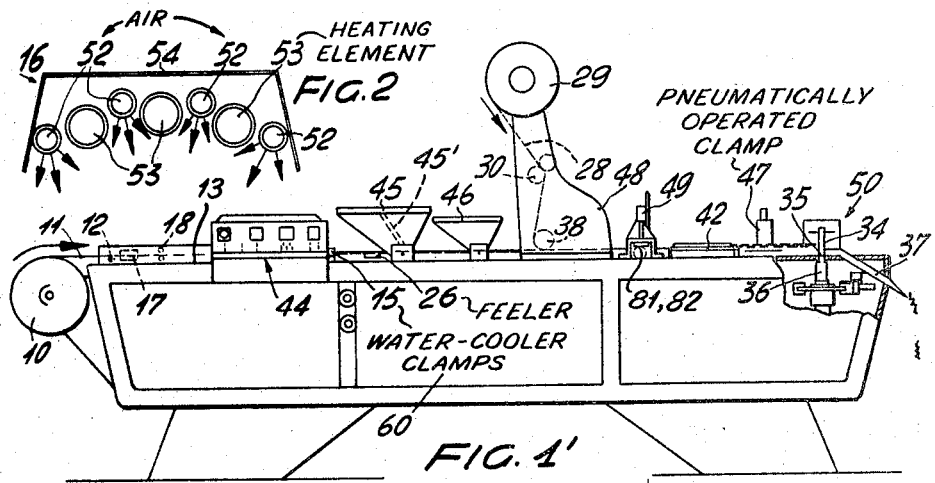
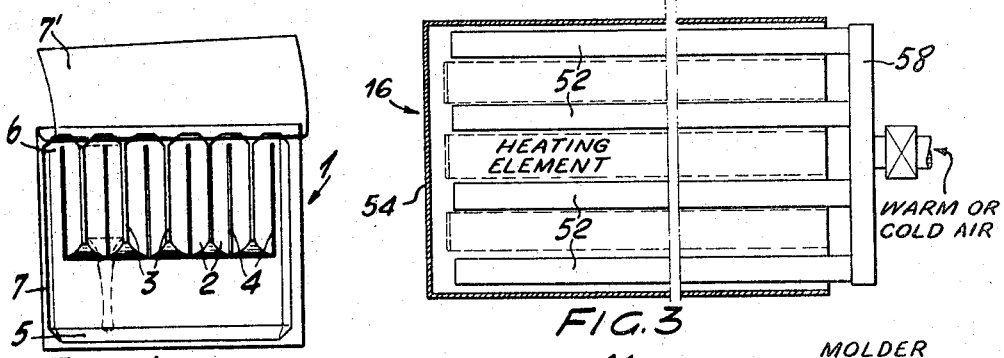
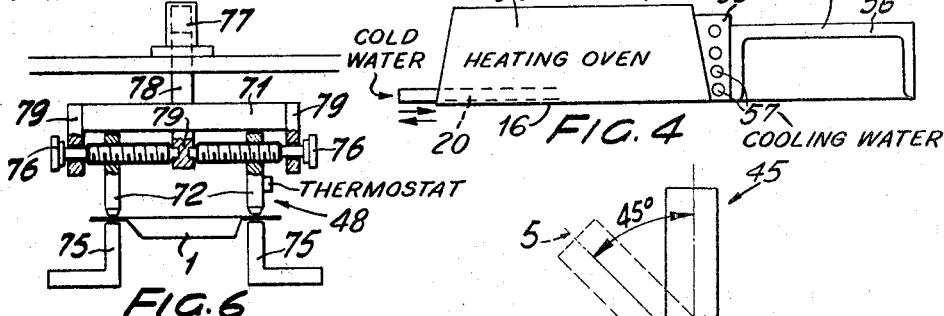
INVENTOR
MASSIMO ARMETTI
BY Toulmin & Toulmin
ATTORNEYS

United States Patent Office 3,389,535
Patented June 25, 1968

3,389,535
PROTECTIVE PACKAGING OF PLASTIC MATERIAL FOR VIALS AND THE LIKE, AS WELL AS PROCESS AND EQUIPMENT FOR OBTAINING IT
Massimo Armetti, Via Gallino 10, Milan, Italy
Filed Apr. 6, 1965, Ser. No. 446,026
Claims priority, application Italy, June 3, 1964, 725,044
4 Claims. (Cl. 53—184)

ABSTRACT OF THE DISCLOSURE

The invention relates to a machine for packaging vials or small bottles between two layers of thermoplastic material by hot-molding a series of trough-like recesses in a lower web that is moved stepwise along a working table by reciprocating gripping clamps, filling the recesses with vials or small bottles, placing over the lower web and its filled recesses a thermoplastic cover sheet, adhering the cover sheet to the web around the margins of the filled recesses to produce a series of sealed containers, and cutting off terminal portions of the series.

---

The invention relates to an equipment for producing plastic containers suitable for the protective packaging of small articles such as vials, small bottles and the like. There are several known types of containers for packaging vials or small bottles by providing a plurality of elongated seats with walls pressing against the lateral surfaces of the vials, but without providing adequate protection for the most vulnerable parts, namely the tips and the bottoms of the vials. Furthermore, since the known containers have to be preformed before the vials can be inserted, there are also the problems of standardizing their sizes and providing storage space for the empty containers. A primary object of this invention is therefore to provide an easily maintained equipment for producing and filling such containers conveniently and efficiently.

The containers produced by the present invention are constituted of several small troughs of thermoplastic material, adapted to be covered by a thermally sealed plastic lid. They are produced by feeding a sheet of thermoplastic material into an oven and compression-molding the sheet or a heated portion of it. The molded product is then cooled, its recesses filled with the articles to be packaged, and the filled containers covered by a plastic lid, heat-sealed and trimmed by a peripheral cutter.

Other features and advantages of this invention will be apparent from the following detailed description with reference to the drawing wherein:

FIGURE 1 is a plan view of a container produced by this invention, with one of the vials shown in place in dotted lines;

FIGURE 1' is a side view of the equipment of this invention, partly in cross section;

FIGURE 2 is a vertical section through the oven;

FIGURE 3 is a plan view of portions of the oven, with the casing in cross section;

FIGURE 4 is a side view of the heating and molding apparatus in combination with the oven of FIGURE 2;

FIGURE 5 is a side view of the charging hopper;

FIGURE 6 is a side view, partly in section, of the welding unit; and

FIGURE 7 is a sectional view of the cutting device for peripheral trimming.

Referring first to FIGURE 1, the container 1 that is produced by this invention comprises a plurality of small troughs 2 molded from synthetic thermoplastic sheet material, the troughs being separated from one another by intermediate lands 3. Each small trough is closed at its bottom along 4, is convex on the outside of its bottom and terminates in front and rear zones 5 and 6 to receive the tips and bottoms of the vials as shown in dotted lines in FIGURE 1, the troughs communicating with one another at one of their ends.

Each group of small troughs is open on top to receive small vials, and is surrounded by a marginal portion 7 for supporting a sheet of plastic 7' to be heat-sealed thereto.

The protection afforded to the vials by the container 1 is enhanced by the presence of protuberances, ribs or the like on the troughs.

The equipment shown in FIGURE 1' for producing the containers 1 consists essentially of a frame or bed 60 whose working table is provided with rails in alignment with blades 75 and counter-cutters 82 for supporting a sheet 11 of thermoplastic material taken from a roller 10 at one end of the working table 13. The thermoplastic sheet, which may be polyethylene, polyvinyl chloride, polystyrene etc., after being drawn from or across the reel or roller 10, passes over a supporting roller 12 at the beginning of the working table, is drawn through cleaning felts 17, and is subjected to a flattening treatment by being drawn through a pair of small rollers 18. It is then gripped by clamps 15 riding on rails along the edges of the table for passage of the plastic sheet through a heating and molding section 44.

The first half of the section 44 is an oven 16, preferably of the infrared radiation and air injection type shown in FIGURES 2 and 3. The air which may be warm or cold flows out from a plurality of small perforated tubes 52 branching out from a supply manifold 58. The tubes 52 are parallel to the heating elements 53 shown in FIGURES 2 and 3. The oven is enclosed in a casing 54 of heat insulating material to minimize heat losses. The injected air creates in the oven a turbulence which ensures uniform heating of the plastic sheet.

The heating and molding section which is located at 44 in FIGURE 1' is also shown in FIGURE 4 which shows a barrier 55 containing cooling water coils 57 between the heater 16 and the molder 56, in contact with the latter, thereby avoiding the necessity of providing the mold itself with cooling coils.

To prevent overheating of the plastic sheet, especially when the operation of the machine is suddenly stopped, the oven 16 is provided with a water-cooled screen 20 slidable into or out of the bottom of the oven underneath the heating elements.

After the plastic sheet 11 has been sufficiently heated to permit molding, it is gripped and drawn into the molding zone by the clamps 15 which can be water-cooled. The molding is preferably done by vacuum or by compressed air, a group of troughs being molded simultaneously by an upwardly moving mold which presses the web against the bell 56 above, while the web is drawn into the mold cavities by suction. An air jet then detaches the web with its molded recesses from the mold, thereby also cooling the web.

The plastic sheet with the recesses molded in it can receive the vials while remaining in a horizontal plane, but is preferably tilted upwardly along one edge, the table 13 being then slightly inclined at 13' in this region. The vial- or bottle-carrying hoppers 45 and 46 are adjustably supported on brackets 63 by clamping screws 61 and 62 to permit the hoppers to be adjusted to the same inclination as the table portion 13' which will not only facilitate the deposition of the vials or bottles in the recesses but will also permit the use of hoppers which are open on one side. The inclination in this region can be anywhere from 0 to 45°.

In order to prevent the dropping out of vials from the hoppers 45 and 46 which would occur after the end of the molded plastic sheet has been reached, a feeler 26 of known construction is positioned immediately ahead of the hopper 45 to stop the machinery upon actuation of the feeler.

Behind the first hopper 45 there is a second hopper 46 for receiving smaller vials, protective covers or labels. The hoppers may also be provided with internal partitions 45′ to provide multiple compartments for vials of different sizes.

The series of containers passes from the hopper 46 to the thermowelding station 48 for sealing the cover sheet that is obtained from a ribbon of thermoplastic material 28 taken from a supply roll 29. After being drawn from a pair of resiliently supported guide rollers 30, the ribbon is applied by the roller 38 to the series of filled containers beneath.

The welding unit for attaching the cover sheet is shown in FIGURE 6. It comprises a pneumatic cylinder 77 and piston 78 carrying a frame 71 with flanges 79 for rotatably supporting a pair of screws 76 to adjust a pair of electrodes 72 so as to permit containers of different widths to be heat-sealed. The electrodes 72 and the counter-blades 75 should be coated with a suitable material to prevent the sealed containers from sticking thereto. Each welding blade 72 can be equipped with a thermostat to control its temperature.

The filled and sealed containers which leave the welding station 48 are moved along on the working table 13 until they reach the trimming station 49, shown in transverse section in FIGURE 7. The trimming is done by a pair of circular cutters 81 cooperating with counter-cutters 82, the cutters and counter-cutters being adjustable laterally by transverse screws in the direction of the double arrows so as to be adaptable to container groups of different widths.

Immediately after the trimming station 49 a group of grippers 42 blocks and stretches the filled and sealed groups of containers to permit accurate lateral trimming thereof at station 49 without irregularity caused by wrinkling. As soon as the web stops and the grippers 42 open and return to their resting positions, a pneumatically controlled clamp 47 comes into action to hold the web in position while the last group of containers is being severed and while the disengaged gripper clamps 15 and 42 are moved rearwardly. Immediately before grippers 15 reach the end of their rearward movement they close, clamp the web and tension it. When grippers 15 have reached the end of their rearward movement, grippers 42 (which have now also come to a stop) again clamp the web so that both grippers are now ready for another forward movement.

At the terminal end of the working stable 13 there is a transverse cutting device 50 to separate the groups of containers from one another. The cutting device 50 comprises a pair of upper blades 34 and a cooperating pair of vertically movable lower blades 35, the upper blades being also movable. The distance between the two lower blades is equal to the distance between successive groups of containers, the cut-away strip of waste material between the two groups of containers being disposed of through the open space between the two lower blades. The individual groups of containers are then delivered by chute 37.

Automatic operation of this equipment is effected by electric timing mechanism which keeps the different parts of the system operating in synchronism, the actuation of the grippers and clamps being delayed wherever necessary.

Although transparent thermoplastic synthetic resins such as polyethylene and polystyrene may be preferable where impact resistance and flexibility are important, it is also possible to use opaque materials where protection against light is necessary. It is also possible to insert an additional device between the last hopper and the cover-applying station 48 a device for depositing a printed label in each container.

It will be understood that this invention is susceptible to modifications in order to adapt it to different usages and conditions and, accordingly, it is desired to comprehend such modifications within this invention as may fall within the scope of the appended claims.

What is claimed is:

1. A packaging machine comprising in combination a working table, means for advancing and stopping intermittently on the working table a web comprising a first thermoplastic sheet, means for heating said web and forming in it while hot a plurality of troughs, a screen with water-cooled coils positioned between said means for heating and said means for forming, means for filling each trough with a small article, means for sealing to the upper periphery of the filled troughs a second thermoplastic sheet, means for trimming the lateral edges of said multiple containers and means for cutting off each terminal multiple container wherein the means for advancing and stopping the web comprises grippers reciprocable longitudinally of the web and guided along the side of the machine to releasably clamp at intervals the lateral edges of the web and a pneumatically actuated clamp to block the web with the formed and filled containers when said grippers are released.

2. A packaging machine comprising in combination a working table, means for advancing and stopping intermittently on the working table a web comprising a first thermoplastic sheet, means for heating said web and forming in it while hot a plurality of multiple containers each provided with a plurality of troughs, means for filling each trough with a small article, said means for filling comprising an internally partitioned charging hopper for use with articles of different sizes, said hopper being adjustable to inclinations between 0° and 45° to the vertical, means for sealing to the upper peripheries of the filled troughs a second thermoplastic sheet, means for trimming the lateral edges of said multiple containers and means for cutting off each terminal multiple container wherein the means for advancing and stopping the web comprises grippers reciprocable longitudinally of the web and guided along the side of the machine to releasably clamp at intervals the lateral edges of the web and a pneumatically actuated clamp to block the web with the formed and filled containers when said grippers are released.

3. A packaging machine as set forth in claim 1, wherein the sealing means includes a welding unit actuated by timer-controlled pneumatic piston to move the blades.

4. A packaging machine as set forth in claim 3, wherein a welding blade of the welding unit is provided with a thermostat which controls the blade temperature.

References Cited
UNITED STATES PATENTS

| | | | |
|---|---|---|---|
| 2,712,717 | 7/1955 | Keller | 53—184 X |
| 3,000,157 | 9/1961 | Ollier et al. | 53—184 |
| 3,229,442 | 1/1966 | Gram | 53—28 |
| 3,309,835 | 3/1967 | Peppler | 53—184 X |

WILLIAM W. DYER, Jr., *Primary Examiner.*

N. ABRAMS, *Assistant Examiner.*